United States Patent [19]

Thomas

[11] 4,260,880
[45] Apr. 7, 1981

[54] OPTICAL CHARACTER SCANNER

[75] Inventor: Robert J. Thomas, Spokane, Wash.

[73] Assignee: Key Tronic Corporation, Spokane, Wash.

[21] Appl. No.: 102,664

[22] Filed: Dec. 12, 1979

[51] Int. Cl.³ .................. G06K 7/14; G06K 9/00; G08C 9/06
[52] U.S. Cl. .................. 235/454; 340/146.3 F; 250/566
[58] Field of Search ............... 235/454, 456, 460, 483; 340/146.3 F, 146.3 Z; 250/566

[56] References Cited

U.S. PATENT DOCUMENTS

| | | | |
|---|---|---|---|
| 2,792,157 | 2/1931 | Amundsen | 235/483 |
| 3,042,806 | 7/1962 | Lubin | 235/460 |
| 3,735,094 | 5/1973 | Dunn | 235/454 |
| 3,737,629 | 6/1973 | See | 340/146.3 F |
| 3,763,352 | 10/1973 | Del Rio et al. | 235/483 |
| 3,894,216 | 7/1975 | Bottles | 235/484 |
| 3,937,928 | 2/1976 | Sasaki et al. | 235/454 |

Primary Examiner—Daryl W. Cook
Attorney, Agent, or Firm—Wells, St. John & Roberts

[57] ABSTRACT

An optical character reader for conversion of information to a machine readable code from a strip of alpha-numeric characters on the face of a document. It includes an elongated document slot along which the document may be hand guided through a predetermined path. Optical viewing means is provided across a scan line intersecting the path of the alpha-numeric characters. A character scanning assembly electronically generates images of each character. Recognition processing means encodes these images into a machine readable code. All of the physical, optical and electronic components are contained within a compact single enclosure. The character scanning assembly is located on a separable support frame that includes a surface adapted to be slidably engaged by the face of the document being read. This support frame contains the viewing slot through which light is reflected from the document face. It also rigidly mounts an array of light-responsive sensors, and an intermediate reflective mirror surface and lenses for focusing of the reflected light onto the light-responsive sensors. Since the support frame mounts the entire optical path of the apparatus, these components can be prealigned prior to being fixedly mounted to a document guiding apparatus.

7 Claims, 11 Drawing Figures

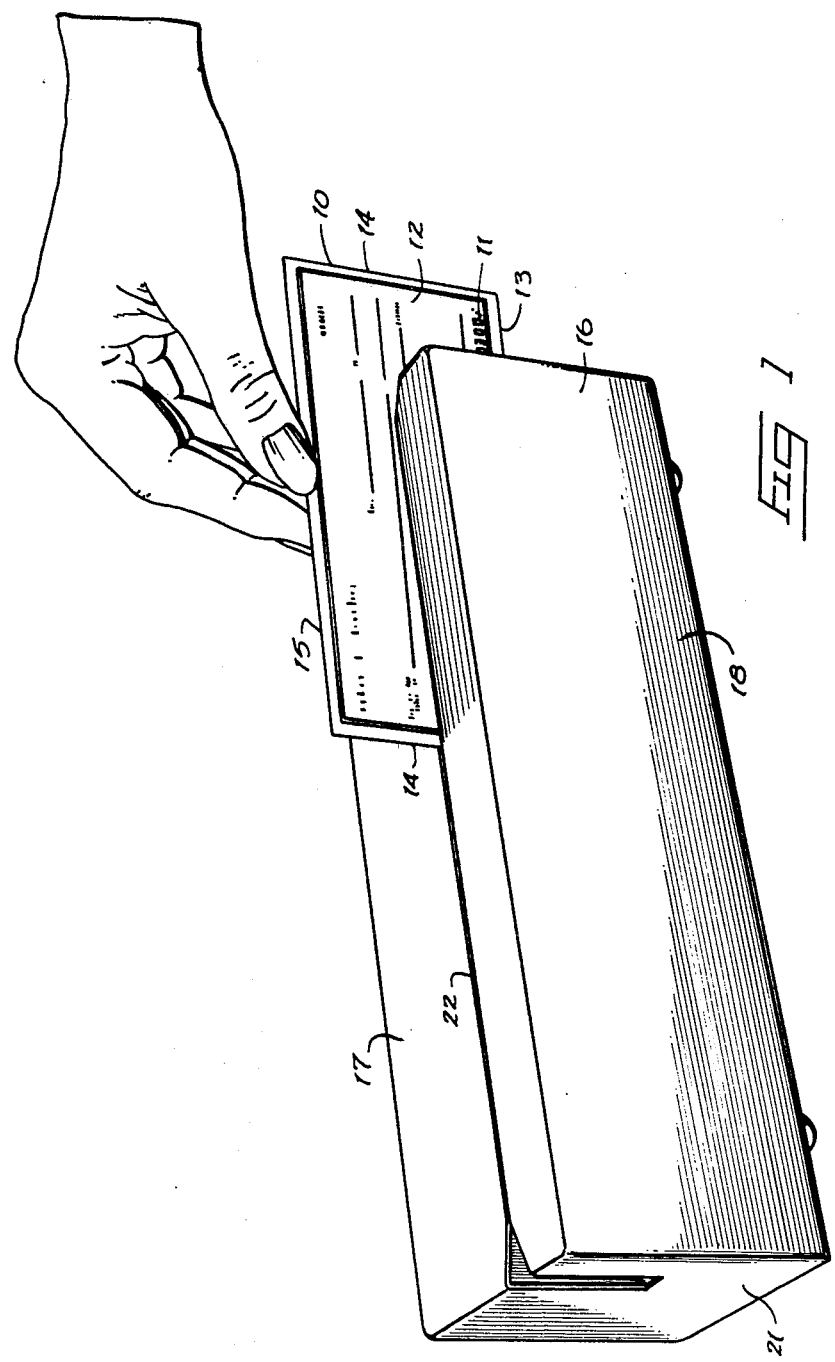

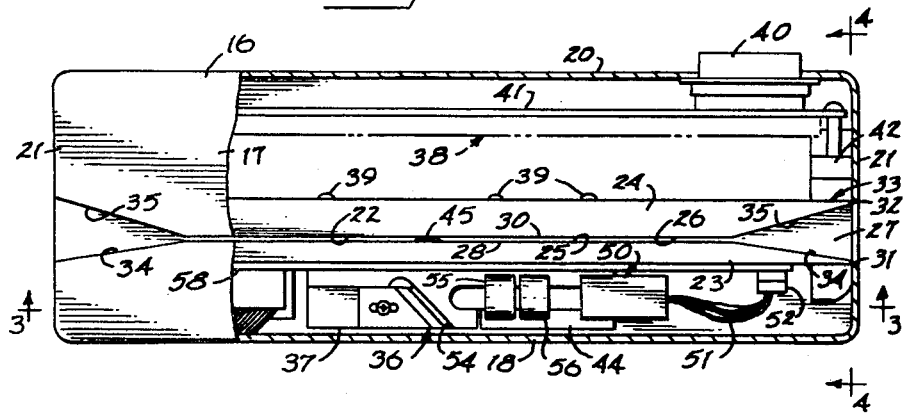
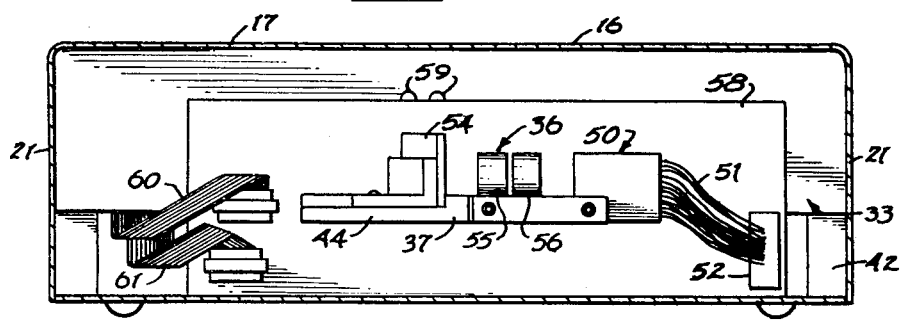
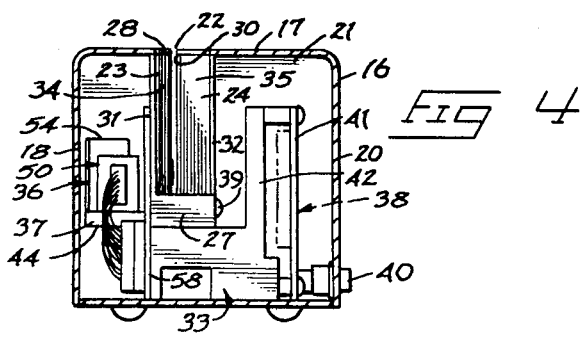

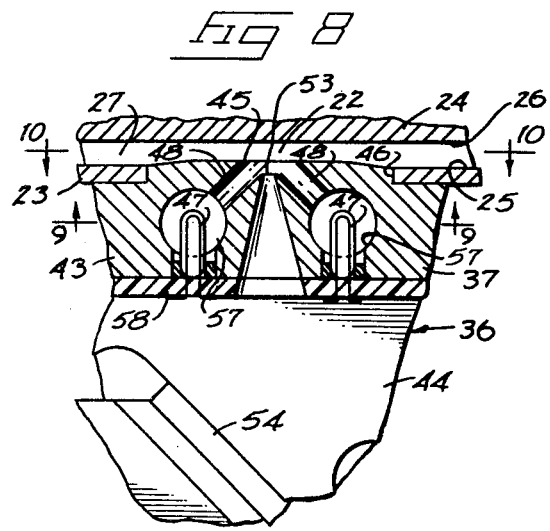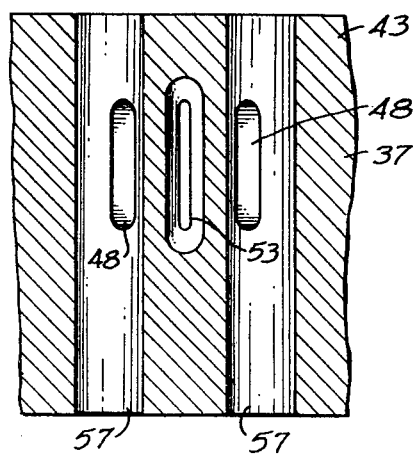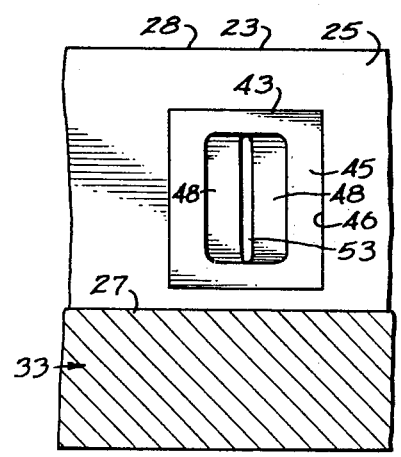

OPTICAL CHARACTER SCANNER

BACKGROUND OF THE INVENTION

This invention relates to a separable scanning apparatus designed to be incorporated within document guide and recognition equipment for reading of alpha-numeric characters appearing on the face of a document. It constitutes a separable support frame having a surface that is slidably engageable by the document face. A viewing slot is formed through the support frame in communication with the stationary wall surface area. Lenses mounted on the frame focus light reflected through the viewing slot onto light responsive sensors. The apparatus is a self-contained optical scanner, whose components can be prealigned prior to assembly of the support frame within the recognition equipment.

Optical scanning of alpha-numeric characters by use of a transverse scan line to detect light and dark reflective light patterns requires extreme precision in the alignment and focusing of light from the scan line to the receiving light-responsive sensors. Such alignment becomes even more difficult with miniaturization of such equipment in conjunction with the production of compact, economical peripherals. Alignment is also an important factor in servicing of such equipment, since field alignment at the site of the user is impractical where lamps, lenses or light-responsive sensors might have to be replaced.

This disclosure relates to an assembly of character scanning components on a separable subframe or support frame which can be fixedly mounted to a document guiding apparatus or other optical character recognition equipment. The support frame includes a stationary wall surface area adapted to be slidably engaged by the document face. By mounting the components of the character scanning apparatus on this unitary frame, all of the components can be aligned when assembled. A complete aligned assembly can be initially installed in the optical character reader when it is constructed and can be replaced as a prealigned unit for servicing purposes. Such replacement will minimize service and repair time and assures that repaired equipment will meet original alignment specifications.

DESCRIPTION OF THE DRAWINGS

FIG. 1 is a perspective view of the apparatus, illustrating its use;

FIG. 2 is a fragmentary plan view of the apparatus;

FIG. 3 is a sectional view taken along line 3—3 in FIG. 2;

FIG. 4 is a sectional view taken along line 4—4 in FIG. 2;

FIG. 8 is an enlarged sectional view taken along line 8—8 in FIG. 7;

FIG. 9 is a sectional view taken along line 9—9 in FIG. 8;

FIG. 10 is a sectional view taken along line 10—10 in FIG. 8;

DESCRIPTION OF THE PREFERRED EMBODIMENT

Figure 5:
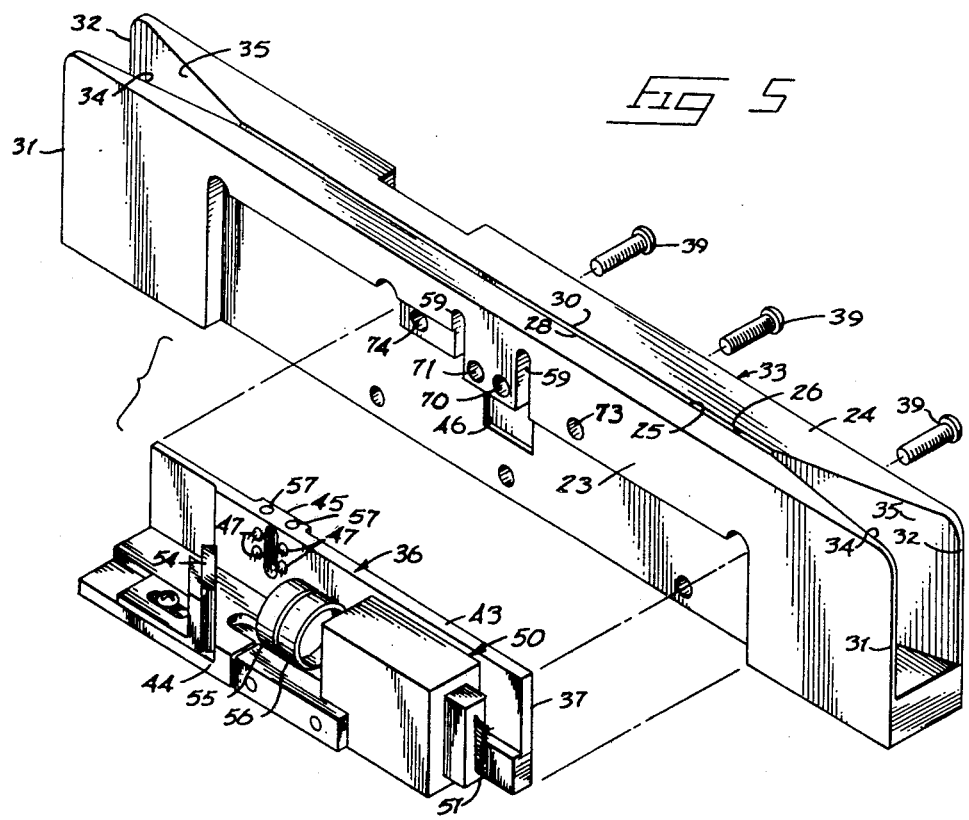
FIG. 5 is an exploded view of the document slot and character scanning assembly.
Figure 6:
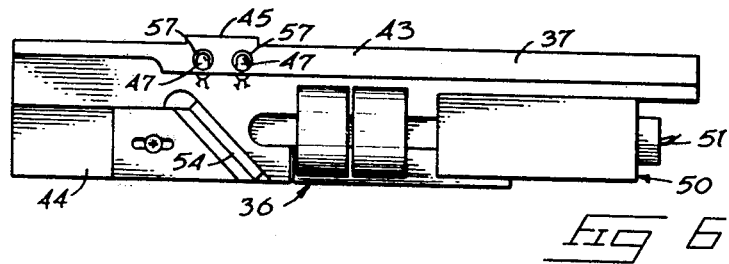
FIG. 6 is an enlarged plan view of the character scanning assembly.
Figure 7:
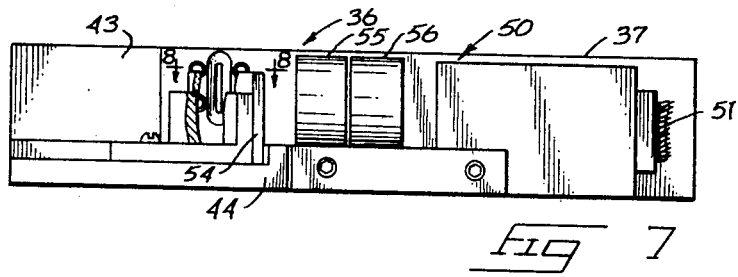
FIG. 7 is a corresponding elevation view.

The present disclosure relates to a compact, manually fed optical character recognition device in which documents are moved along a slot for reading purposes. It is designed for reading a longitudinal strip of visual indicia 11 containing discrete alpha-numeric characters located along the face 12 of a document 10. The document 10 illustrated in FIG. 1 is a conventional check blank used for commercial banking purposes and having a printed line of machine readable information that typically identifies the bank, the user's account, and the amount of the check.

The document 10 has a constant thickness and can be made from a sheet of paper, paperboard, plastic or other suitable sheet material. Its face 12 is bounded along one side by a planar longitudinal reference edge 13, which in this illustration constitutes the bottom edge of the rectangular check blank. Document 10 has a predetermined width dimension in a direction perpendicular to the reference edge 13. This width dimension would be measured across the end edges 14 which extend between the reference edge 13 and the remaining longitudinal edge 15 presented along the top of the check blank.

A strip of visual indicia 11 is located on the face 12 within transversely spaced boundaries that are parallel to one another and are also parallel to the lower reference edge 13 of document 10. In this illustration, these boundaries are coincident with the upper and lower edges of the alpha-numeric characters imprinted on the check blank.

As a general definition of the document geometry pertinent to this disclosure, the strip of visual indicia will have a transverse width perpendicular to the document reference edge and will be arranged parallel to said edge.

The present apparatus is provided within an enclosure generally designated at 16. The enclosure 16 has outer surfaces including an upper longitudinal wall surface 17, a front wall surface 18, a rear wall surface 20 and oppositely facing end wall surface 21. The enclosure 16 as illustrated is rectangular in shape, and contains all the interior components of the apparatus in the completed assembly (FIGS. 1 through 4).

The upper wall surface 17 and end wall surfaces 21 are interrupted by a longitudinal document slot 22. Slot 22 intersects the walls on which these surfaces are formed and which extends the full length of enclosure 16. Slot 22 is a document guiding apparatus by which individual documents 10 can be fed longitudinally the length of the enclosure 16 to permit machine reading of the strip of visual indicia 11.

Located within enclosure 16 is a rigid frame generally shown at 33. The frame 33 includes the stationary support elements for the various components of the apparatus. It includes upwardly protruding front and back longitudinal walls 23, 24 which are located in close opposed positions. The walls 23, 24 have respective opposed inner surfaces 25, 26 spaced apart transversely by a distance adequate to receive the thickness of a document 10 between them. They include coplanar longitudinal upper edges 28, 30 and coplanar outer ends 31, 32, respectively. A base 27 extending between the inner surfaces 25, 26 of the two walls 23, 24 completes the boundaries of document slot 22. Base 27 is positioned at a location spaced inwardly from the longitudinal upper edges 28, 30 of walls 23, 24 a distance less than the height across the document 10. The upper edges 28, 30 are located in close proximity to the upper longitudinal wall surface 17 of enclosure 16. The slot depth is such that a document 10 can be manually moved within it in a longitudinal direction with respect to the rigid frame 33 and enclosure 16. Document 10 is hand-held and guided along slot 22 by sliding engagement of base 27 by the document reference edge 13. This general operation is illustrated in the view shown in FIG. 1.

To facilitate entry of document 10 within document slot 22 from either end of enclosure 16, the outer ends of slot 22 are formed by inwardly converging surfaces 34, 35 formed at the respective longitudinal ends of the front and back walls 23, 24. The slot access openings presented by the exterior wall surfaces 17 and 21 of enclosure 16 are correspondingly tapered in shape (FIG. 1). However, the operational section of slot 22 intermediate its ends is formed with the inner surfaces 25, 26 of the front and back walls 23, 24 parallel to one another and spaced apart a distance slightly greater than the thickness of the document 10 designed to be fed between them.

The general assembly of the apparatus essentially comprises character scanning means 36 mounted to the frame 33 and located within enclosure 16 for electronically generating images of each alpha-numeric character. As will be described below, the character scanning means 36 is mounted on a separable support frame 37 that is detachably fixed to and forms part of rigid frame 33. The electronic components of the character scanning means 36 are located on a printed circuit board 58 fixed alongside front wall 23 (FIG. 3).

The apparatus is completed by electronic recognition processing means located on the rigid frame 33 and also positioned within an enclosure 16. The recognition processing means 38 is operatively connected to the character scanning means 36 for analyzing the electronic images generated thereby and for encoding the images into a machine readable code. It provides the final coded information at output terminals 40 adapted to be wired to the Host Processor (not shown).

The recognition processing means is located on a printed circuit board 41 rigidly secured to end support brackets 42, which in turn also mount the slot structure presented by walls 23, 24 and base 27. The electronic components of the character scanning means 36 on circuit board 58 are connected to components on the board 41 through ribbon conductors 60, 61 arranged between the two upright boards. While the precise arrangement of the electronic components is not critical to an understanding of this invention, it is to be noted that all electronic components of the reader assembly are fully contained within the compact enclosure 16.

As an example of the practical application of this equipment, the illustrated apparatus might read a printed strip of visual indicia 11 on the face 12 of a check blank and be utilized by bank tellers to verify the status of a customer's account by access to information stored in a central computer memory. It might be similarly used by personnel in sales establishments to verify the status of a checking account balance before accepting or cashing the check written on the face 12 on the document 10.

The details of the character scanning means 36 are best illustrated in FIGS. 5 through 10. The character scanning means 36 is mounted to the upright wall 43 and protruding shelf 44 of the separable support 37 as a subassembly which permits prealignment of the physical components of the scanning means prior to assembly on the remaining elements of the rigid frame 33. This also permits these components to be pre-aligned and readily replaced as a unit for servicing purposes.

The support frame 37 includes a stationary wall surface area 45 (FIG. 10) which is adapted to be slidably engaged by the document face 12. The section of upright wall 43 about area 45 serves as a document viewing assembly for reflecting light from the strip of visual indicia 11 on document 10. The details of this assembly are shown in FIGS. 8–10.

The front wall 23 along the open slot 22 has a complementary opening at 46 to receive the wall surface area 45 of the frame 37 in a position at which the surface area 45 is substantially coplanar to the inner surface 25. To assure sliding engagement of the document face 12, it is preferable that the area 45 be slightly radiused and protrude very slightly beyond surface 25 and extend within the confines of slot 22.

The opening 46 is located elevationally between the slot base 27 and the longitudinal edges 28, 30 of the walls 23, 24. The distance between base 27 and the mounted wall surface area 45 corresponds to the transverse separation between the lower reference edge 13 of document 10 and the strip of visual indicia 11. Thus, the moving strip of visual indicia 11 will overlap the stationary area 45 as the document 10 traverses the length of slot 22.

Light means is provided on the frame 37 for directing light onto the face 12 of a document 10 across the moving path of the strip of visual indicia 11. This light means is illustrated as four incandescent lamps 47 mounted to the back of printed circuit board 58 and recessed within the upright wall 43 immediately outward from the wall surface area 45 (FIG. 8). The light means also includes upright light guide slots 48 which converge toward one another from the lamps 47 and openly intersect the critical wall surface area 45.

Light sensing means 50 is mounted to shelf 44 of frame 37 for producing analog signals at individual terminals proportional to the level of light intensity directed to them. Means 50 in general comprises an array or matrix of light-responsive sensors for detecting the geometric relationship of light values directed upon it. The unit illustrated is a conventional self-scanning linear photodiode Array which consists of a single vertical row of silicon photodiodes. The individual output terminals are shown as a bundle of conductors 51 leading to a receptacle 52 at one end of wall 23 (FIG. 3), which in turn is wired to the proper components on the printed circuit board 41.

Optical viewing means is used between the light means and array 50 to direct reflected light from the face of document 10 to the array of photodiodes. The optical viewing means includes a narrow vertical viewing slot 53 that centrally intersects the two light guide slots 48 at a plane slightly recessed from the wall surface area 45 (FIG. 8). The width of the knife edge slot 53 is sufficiently narrow to have an aperture function in assuring viewing depth of field through it across the permissible planar locations in which the face 12 of a document 10 might be viewed within document slot 22. The narrow field viewable through the viewing slot 53 constitutes a scan line which is physically positioned with respect to document slot 22 so as to traverse the strip of visual indicia 11. The side edges of slot 53 formed through the upright wall 43 of subframe 37 converge outwardly to permit maximum reflectance of light through the thickness of the upright wall 43. The light path, which is initially perpendicular to the wall surface area 45, is turned 90° by the reflective surface of a mirror 54 mounted at an angle of 45° across shelf 44, and is beamed to focusing lenses 55, 56 arranged along shelf 44 to properly direct the reflected light patterns from slot 53 onto the photodiodes of the Array 50. The lenses 55,56 and Array 50 are aligned parallel to the wall surface area 45.

Since the separable frame 37 contains the surface area 45 which the field viewable through slot 53 must engage, the entire optical path from document 10 to Array 50 can be prealigned on frame 37 independently of the remaining components of the reader. This is much less cumbersome than the alternative of aligning the components on the total assembly and eliminates alignment of individual elements when servicing the equipment. Frame 37 is fixed as part of rigid frame 33 by releasable screws 39 (FIG. 3).

Referring now to FIGS. 8, 9 and 10, the wall surface area 45 includes provision for dispersal of environmental dust and solid particles that might otherwise collect about the area of the viewing slot 53 as documents 10 are fed past it, particularly when the documents are made from paper or paperboard. To minimize the difficulties that are encountered due to dust, upright ventilation ducts 57 are formed within the upright wall 43 and surround the lamps 47. They openly intersect the light guide slots 48. As discussed previously, lamps 47 are preferably of the incandescent type, but might be any suitable heat emitting light source.

The ventilation ducts 57 provide convection cooling of the lamps 47 or other light means and dispersion of environmental dust in the vicinity of the viewing slot 53. Each duct 57 extends through the height of the upright wall 43 within the subframe 37 (FIG. 9) and has open communication in frame 33 beyond the boundaries of the upright wall 43 at positions above and below the width of slot 53. The lower end of each duct 57 is open and unobstructed in the completed assembly. Ventilation of the upper end is assured through open communication along mating duct extensions 59 in wall 23 (FIGS. 3,5).

As can be seen in FIG. 9, ducts 57 are preferably cylindrical apertures formed parallel to one another and extending through the full height of wall 43. Ducts 57 are in open cmmunication with the complete height of each light guide slot 48. Upright movement of air within ducts 57 will tend to also draw air (and small dust or solid particles) from the edges of the viewing slot 53. The moving currents of air will tend to disperse this dust outside the viewing slot area, where it can come to rest on horizontal surfaces within the enclosure 16 not critical to the optical path of the character scanning means.

Figure 11:
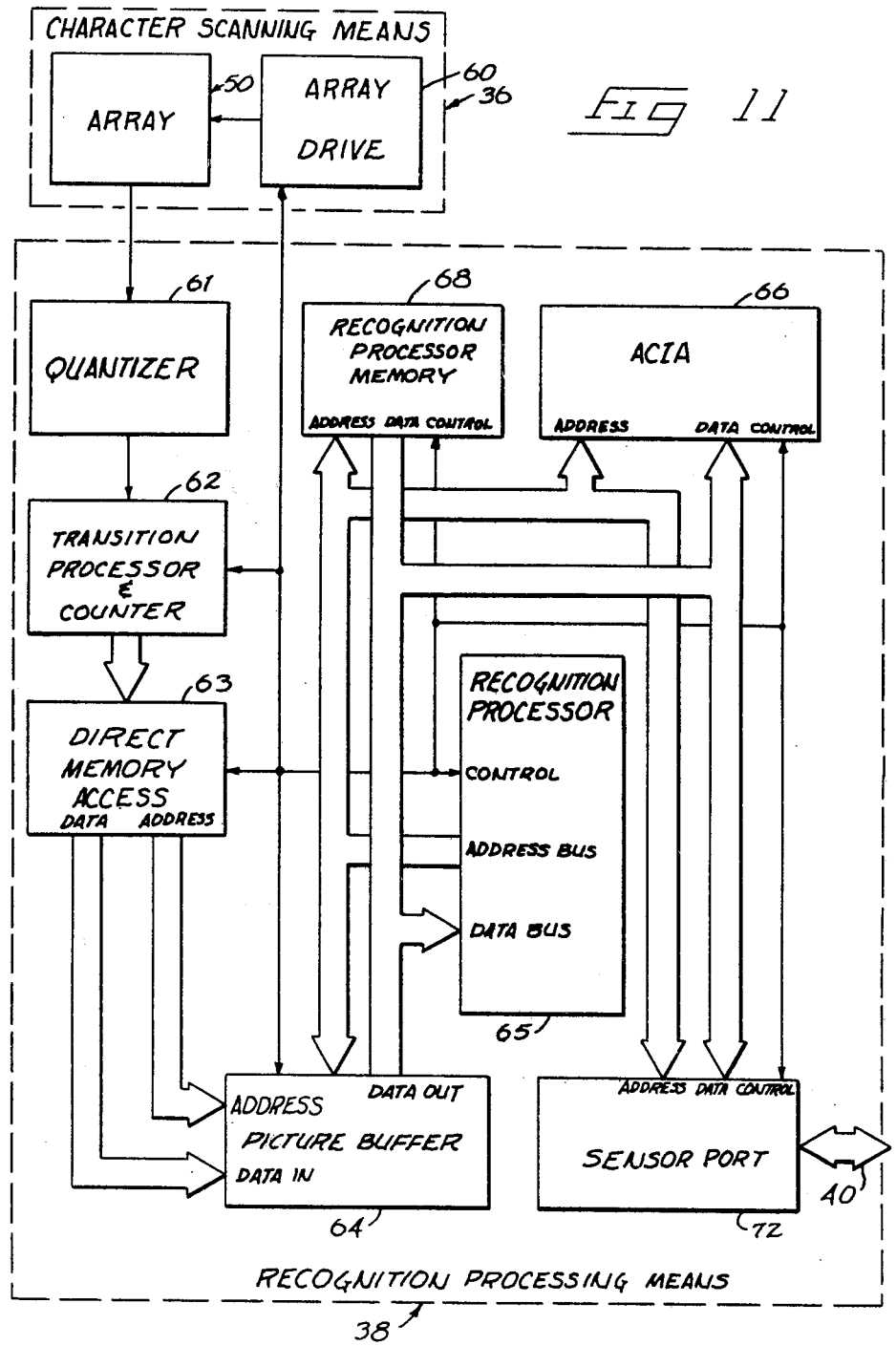
FIG. 11 is a schematic flow diagram of the electronic components.

FIG. 11 schematically illustrates the electronic components of the character scanning means 36 and the recognition processing means 38, which are generally outlined within dashed line boundaries.

The character scanning means 36 includes Array 50, which is illustrated by the RL 256G Array made by Reticon Corporation of Sunnyvale, Calif. This is a 256 element photodiode array of photodiodes as generally described above. It is connected to an Array Drive 60, which provides all the necessary signals to interface to and provide control of Array 50 as specified by its manufacturer. The Array Drive 60 also generates all the required signals to control the Quantizer 61 and the Transistion Processor and Counter 62.

The Quantizer 61 basically functions as a comparator. The analog video signal directed to it from Array 50 is compared within its circuitry to a reference voltage source. This reference voltage value was derived as a preselected percentage of the output from a peak white sample and hold circuit within the Quantizer. A peak white follower circuit of the Quantizer tracks the maximum amplitude of the video signal coming from Array 50. The output of the Quantizer comprises digitized video information corresponding to the light values received on the individual photodiodes in Array 50.

The Transistion Processor and Counter 62 is a digital video processor which takes the digitized video information from Quantizer 50 in the form of a serial bit stream and analyzes it, one bit at a time, looking for valid transitions. A valid white to black transition for this reader was defined as a sequence of at least two consecutive white bits of information followed by at least two consecutive black bits. Similarly, a valid black to white transition is the reverse of this sequence. The circuit also counts the number of white or black bits received between valid transitions. The white and black count information is then passed on to the Direct Memory Access circuit 63.

The Direct Memory Access circuit receives count information from Transition Processor and Counter 62. This count information is then deposited into Picture Buffer 64. The Direct Memory Access scheme used in this reader is a pseudo cycle stealing type technique, where all accesses are done during Phase I. Therefore no central processor time is lost doing memory accesses.

The Picture Buffer 64 contains 16 bytes of Random Access Memory, which are organized into two columns, 8 bytes each. It also has separate Data-In and Data-Out ports. The picture buffer is therefore a Read Only port for the recognition processor 65 and a Write Only port for the Direct Memory Access circuit 63. The Picture Buffer 64 appears to be only one column long to both the recognition processor 65 and the Direct Memory Access circuit 63, because address bit 3 is not used by either circuit, thus utilizing a memory mapping technique. However, the logic state of address bit 3 is changed once every scan of the Array 50, which effectively causes the memory remapping function.

The recognition processor 65 is a Motorola MC6802 n-channel 40 pin Integrated Circuit. It is manufactured by Motorola Corporation of Phoenix, Ariz. It executes 72 variable length instructions and is also capable of directly addressing 65K bytes of memory. The 6802 Microprocessor contains 128 bytes of internal Random Access Memory starting at address 0000 and going to 007F (hexadecimal). It is properly programmed to carry out the logical functions necessary for operation of the reader as described above.

The memory address space of the microprocessor 65 has been allocated to Read Only Memory, Input/Output, Picture Buffer, and Debug equipment needs.

There are no specific Input/Output instructions for the 6802 Microprocessor. Therefore, Input/Output is done by using the "Memory Mapped" technique. This means that outputs from this system are the same as a memory write, and inputs are the same as a memory read.

The recognition processor memory (ROM) 68 within is basically split into two halves. The top half is reserved for Debug equipment usage and the bottom half is allocated to the recognition part of this system.

Since address bits 13 and 15 are not used in this system, the memory space allocated for the Recognition Program in memory 68 is replicated many times. The preferred memory space that should be used for the Recognition program is 7800 (Hexadecimal) to 7FFF (Hexadecimal).

The Picture Buffer is first located in memory at 1000 (Hexadecimal) to 1007 (Hexadecimal).

The Asynchronous Communications Interface Adaptor (ACIA) 66, conforms to an Electronic Industries Association Standard RS232C having a port first located in memory at 1400 (Hexadecimal) to 17FF (Hexadecimal).

The output terminals at customer Input/Output port 40 provide a wired communication path which consists of Receive Data and Transmit Data. This path provides means for connection to the Host Processor (not shown).

The reader is also provided with two control sensors 70, 71 that are physically mounted on wall 23 at opposite sides of the viewing slot 53 (FIG. 5). They enable the recognition processor 65 to identify the direction of travel of each document 10 moved through the slot 22. They are operably connected to the sensor port shown at 72.

Various modifications might be made with respect to specific electronic components of this invention. The functional attributes of these components are therefore the only details believed to be essential to an understanding of the invention disclosure.

Having described our invention, I claim:

1. An optical character scanning apparatus for reading a strip of visual indicia located along the face of a document, comprising:
   a support frame having a stationary wall surface area adapted to be slidably engaged by the document face;
   a viewing slot formed through the frame in open communication with said wall surface area;
   an array of light-responsive sensors mounted to said frame;
   lens means mounted to said frame intermediate the viewing slot and the array of light-responsive sensors for focusing light reflected through the viewing slot onto the array of light-responsive sensors;
   and means for fixedly mounting the frame to a document guiding apparatus, whereby optical alignment of the viewing slot, array of light-responsive sensors and lens means may be accomplished on the frame prior to such mounting.

2. An apparatus as set out in claim 1 further comprising:
   light means on said frame for directing light onto the face of a document within the field of the viewing slot as the face of the document is slidably engaged by the stationary wall surface.

3. An apparatus as set out in claim 1 further comprising:
   a mirrored surface on said frame facing toward the viewing slot at a 45° angle;
   said lens means and array of light-responsive sensors being arranged on said frame at a 45° angle relative to the mirrored surface and along a line parallel to said stationary wall surface area.

4. An apparatus for reading a longitudinal strip of visual indicia containing discrete alpha-numeric characters located along the face of a document, wherein the document has a constant thickness and its face is bounded along one side by a planar longitudinal reference edge, the document having a predetermined width dimension perpendicular to the reference edge, the strip of visual indicia being located within transversely spaced boundaries parallel to one another and to the reference edge of the document;
   a rigid frame;
   an elongated document slot formed through the length of the frame;
   said document slot being bounded by a pair of opposed walls having inner surfaces faced apart to freely receive the thickness of a document between them, said walls having coplanar longitudinal edges and outer ends;
   said document slot also being bounded by a base that extends between said pair of walls at a location spaced inwardly from the longitudinal edges thereof a distance less than the document height;
   whereby the document can be manually moved in a longitudinal direction within the document slot with respect to the frame, the document being hand-held and guided by sliding engagement of the base by the reference edge of the document;
   a separable support frame having a stationary wall surface area adapted to be slidably engaged by the document face;
   a viewing slot formed through the support frame in open communication with said wall surface area;
   an array of light-responsive sensors mounted to said support frame;
   lens means mounted to said support frame intermediate the viewing slot and the array of light-responsive sensors for focusing light reflected through the viewing slot onto the array of light responsive sensors;
   one of said walls of said rigid frame having an opening formed therein to receive the stationary wall surface area of the support frame in a position at which it is substantially coplanar to the inner surface of said one wall;
   and means for fixably mounting the support frame to said one wall, whereby optical alignment of the viewing slot, array of light-responsive sensors and lens means can be accomplished on the support frame prior to such mounting.

5. An apparatus as set out in claim 4 wherein the opening formed through said one wall of the rigid frame is located between the base of the document slot and the longitudinal edges of the walls on said first frame, the distance between the base and the opening corresponding to the separation between the reference edge of a document and the strip of visual indicia.

6. An apparatus as set out in claim 4 further comprising:
   light means on said support frame for directing light onto the face of a document within the field of the viewing slot as the face of the document is slidably engaged by the stationary wall surface.

7. An apparatus as set out in claim 4 further comprising:
   a mirrored surface on said support frame facing toward the viewing slot at a 45° angle;
   said lens means and array of light-responsive sensors being arranged on said support frame at a 45° angle relative to the mirrored surface and along a line parallel to said stationary wall surface area.

* * * * *